(12) United States Patent
Daguenet

(10) Patent No.: US 7,862,295 B2
(45) Date of Patent: Jan. 4, 2011

(54) DEVICE FOR GUIDING A STREAM OF AIR ENTERING A COMBUSTION CHAMBER OF A TURBOMACHINE

(75) Inventor: Luc Henri Claude Daguenet, Corbeil Essonnes (FR)

(73) Assignee: SNECMA, Paris (FR)

( * ) Notice: Subject to any disclaimer, the term of this patent is extended or adjusted under 35 U.S.C. 154(b) by 864 days.

(21) Appl. No.: 11/754,073

(22) Filed: May 25, 2007

(65) Prior Publication Data
US 2007/0271924 A1 Nov. 29, 2007

(30) Foreign Application Priority Data
May 29, 2006 (FR) .................................. 06 04745

(51) Int. Cl.
*F01D 9/04* (2006.01)
(52) U.S. Cl. ................. 415/191; 415/209.3; 415/210.1; 415/211.2; 60/751
(58) Field of Classification Search ................. 415/191, 415/209.3, 209.4, 210.1, 211.2; 60/751
See application file for complete search history.

(56) References Cited
U.S. PATENT DOCUMENTS

| 657,366 | A | | 9/1900 | Smith | |
|---|---|---|---|---|---|
| 4,416,111 | A | * | 11/1983 | Lenahan et al. | ................ 60/795 |
| 4,487,015 | A | * | 12/1984 | Slattery et al. | ................. 60/800 |
| 4,503,668 | A | | 3/1985 | Duncan, III et al. | |
| 5,077,967 | A | * | 1/1992 | Widener et al. | ................ 60/772 |
| 5,211,003 | A | | 5/1993 | Samuel | |
| 5,249,921 | A | * | 10/1993 | Stueber et al. | ............... 415/138 |
| 5,332,360 | A | * | 7/1994 | Correia et al. | ............ 415/209.3 |
| 6,554,569 | B2 | * | 4/2003 | Decker et al. | ................ 415/192 |

FOREIGN PATENT DOCUMENTS

| EP | 0 942 150 A2 | 9/1999 |
|---|---|---|
| EP | 1 378 631 A2 | 1/2004 |
| EP | 1 431 516 A2 | 6/2004 |

* cited by examiner

Primary Examiner—Ninh H Nguyen
(74) Attorney, Agent, or Firm—Oblon, Spivak, McClelland, Maier & Neustadt, L.L.P.

(57) ABSTRACT

A device for guiding a stream of air entering a combustion chamber of a turbomachine is disclosed. The device includes a flow straightener followed by a diffuser. One of the flow straightener shrouds is formed as one with one wall of revolution of the diffuser. The other flow straightener shroud is added and attached to the other wall of revolution of the diffuser. The vanes of the flow straightener are secured by one end to one shroud of the flow straightener and separated by a small clearance from the other shroud at their other end.

20 Claims, 4 Drawing Sheets

DEVICE FOR GUIDING A STREAM OF AIR ENTERING A COMBUSTION CHAMBER OF A TURBOMACHINE

BACKGROUND OF THE INVENTION

The present invention relates to a device for guiding a stream of air entering a combustion chamber of a turbomachine, such as an aircraft turbojet or turboprop engine.

A device of this type is positioned at the outlet of a compressor and comprises a flow straightener followed by a diffuser, the diffuser comprising two coaxial walls of revolution joined together by radial partitions and the flow straightener comprising two coaxial shrouds axially aligned with the two walls of revolution of the diffuser respectively, and between which substantially radial vanes extend.

DESCRIPTION OF THE PRIOR ART

In the state of the art, it is known practice to form the flow straightener and the diffuser independently of one another in order to optimize their shape, their size and their function, and then for the downstream end of the flow straightener to be fixed by appropriate means to the upstream end of the diffuser. However, the fixing means used are heavy and bulky and may create pressure drops in the flow of air through the device.

It is also known practice for the flow straightener and the diffuser to be formed as one. However, this technique is very restricted because it does not allow the functions to be optimized nor does it allow the production of complex flow straighteners, particularly flow straighteners comprising a great many vanes of small radial dimension (such as, for example, a flow straightener comprising over 100 vanes). In particular, it is extremely complicated to cast a flow straightener and a diffuser as one because the casting cores that need to be inserted between the vanes of the flow straightener and the radial partitions of the diffuser are not very accessible and are therefore very difficult if not impossible to extract.

SUMMARY OF THE INVENTION

It is a particular object of the invention to provide a simple, economical and effective solution to these problems of the prior art.

To this end, the invention proposes a device for guiding a stream of air entering a combustion chamber of a turbomachine, comprising a flow straightener followed by a diffuser, the flow straightener comprising two coaxial shrouds between which substantially radial vanes extend, and the diffuser comprising two coaxial walls of revolution joined together by radial partitions, wherein one of the shrouds of the flow straightener is formed as one with one wall of revolution of the diffuser, the other of the shrouds of the flow straightener being added and attached to the other wall of revolution of the diffuser, the vanes of the flow straightener being secured by one end to one shroud of the flow straightener and separated by a small clearance from the other shroud at their other end.

According to the invention, just one of the shrouds of the flow straightener is formed as one with the diffuser, and the other shroud of the flow straightener is attached and fixed, for example welded, to the diffuser so that the device becomes a one-piece unit. The device according to the invention therefore does not require any special heavy and bulky fixing means, thus allowing the mass of the device to be reduced and making it possible not to restrict the aerodynamic function whereby the stream of air is guided by the device.

The invention is therefore a compromise between the manufacturing techniques hitherto used and allows the functions to be optimized while at the same time maintaining relative ease of manufacture. In particular, the shapes and sizes of the flow straightener can be optimized independently of those of the diffuser and are not restricted by the method used to produce the device, it being possible for the flow straightener to be complicated and to have a small radial dimension and a great many vanes. For example, when one of the shrouds of the flow straightener and the diffuser are formed as a single casting with the vanes of the flow straightener and the radial partitions of the diffuser, the casting cores are readily accessible for extraction because the other of the shrouds of the flow straightener is not present.

The invention makes it possible, in general, to save on the need to produce one of the shrouds of the flow straightener, because this shroud is cast with the diffuser. It also makes it possible to save on having to produce the flow straightener vanes, when these are cast with the diffuser.

In addition, it is simpler to manufacture and to install and allows a mass saving that is not insignificant over current techniques. It also reduces the risks of non-conformity, reduces manufacturing times and improves reliability because the flow straightener-diffuser assembly is ultimately a one-piece monobloc unit.

According to another feature of the invention, the outer shroud of the flow straightener and the outer wall of revolution of the diffuser are formed as one, and the end of the inner shroud of the flow straightener is fixed, for example welded, to the upstream end of the inner wall of revolution of the diffuser.

In one embodiment of the invention, the vanes of the flow straightener are secured via their radially outer end to the outer shroud of the flow straightener and are separated by a small radial clearance from the inner shroud of the flow straightener.

As an alternative, the vanes of the flow straightener are secured via their radially inner end to the inner shroud of the flow straightener and are separated by a small radial clearance from the outer shroud of the flow straightener.

The clearance between the vanes and the shroud of the flow straightener ranges, for example, between about 0.1 and 0.5 mm in operation.

The vanes are secured to the shroud of the flow straightener by inserting and fixing, for example by brazing, one of the ends of the vanes in a corresponding slot made in the shroud. The vanes may thus be optimized and produced independently of the shroud to which they are fixed.

As an alternative, the vanes are formed as one with the shroud of the flow straightener. When this shroud is the outer shroud of the flow straightener, the vanes are formed at the same time as the diffuser.

The inner shroud of the flow straightener advantageously comprises an annular axial rim collaborating with the inner wall of revolution of the diffuser to make it easier for the shroud to be positioned and fixed on the diffuser.

The invention also relates to a diffuser for a turbomachine, comprising two coaxial walls of revolution joined together by radial partitions, wherein one of the walls of revolution of the diffuser is extended axially in the upstream direction beyond the other of the walls of revolution of the diffuser to form a shroud of a flow straightener intended to be positioned axially upstream of the diffuser.

According to one embodiment, the upstream extension of the wall of the flow straightener comprises a plurality of radial through-slots uniformly distributed about the axis of the diffuser. There are, for example, in excess of 100 of such slots.

As an alternative, the upstream extension of the wall of the flow straightener is formed as one with radial vanes which are uniformly distributed about the axis of the diffuser. There are, for example, in excess of 100 of such vanes.

The invention also relates to a shroud for a turbomachine flow straightener and which is formed as one with vanes extending radially from a cylindrical surface of the shroud and distributed uniformly about the axis of the shroud.

The invention also relates to a shroud for a turbomachine flow straightener and which comprises a plurality of radial through-slots uniformly distributed about the axis of the shroud.

In addition, the invention relates to a vane for a turbomachine flow straightener, comprising a leading edge and a trailing edge for the gases and which at one of its longitudinal ends comprises means for fitting into a corresponding slot in a flow straightener shroud, in a direction substantially parallel to the longitudinal axis of the vane.

Finally, the invention relates to a turbomachine, such as an aircraft turbojet or turboprop engine and which comprises a device as described hereinabove.

BRIEF DESCRIPTION OF THE DRAWINGS

The invention will be better understood and other details, features and advantages of the present invention will become apparent from reading the following description, given by way of nonlimiting example and with reference to the attached drawings in which.

DESCRIPTION OF THE PREFERRED EMBODIMENTS

Figure 1:
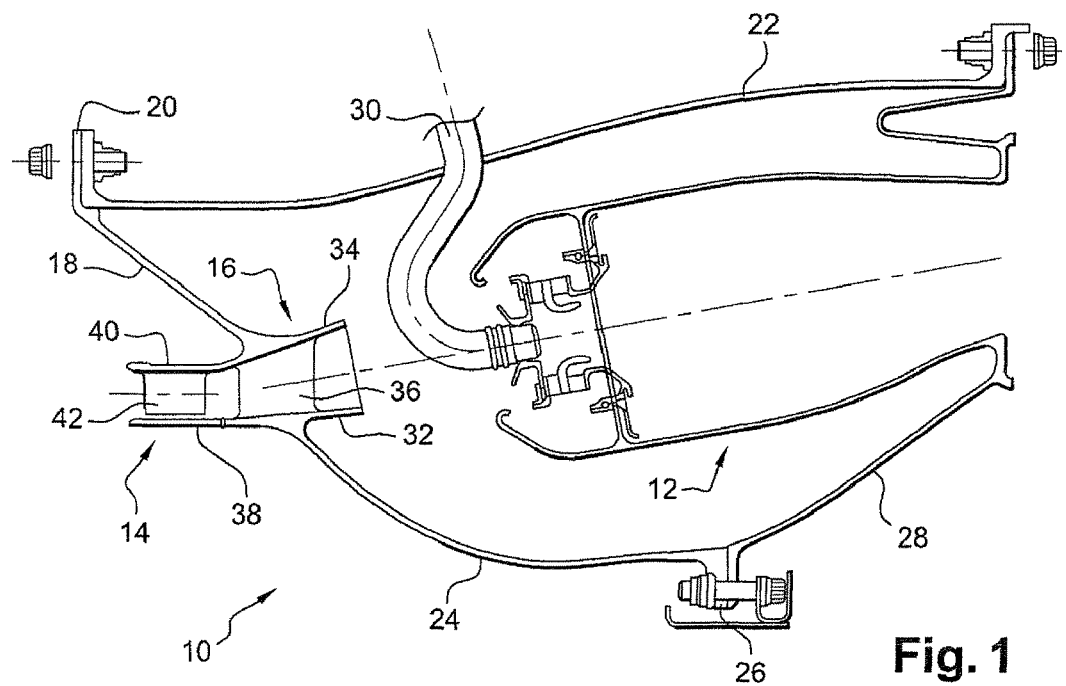
FIG. 1 is a partial schematic view in axial section of the device for guiding a stream of air according to the invention.

The device 10 according to the invention depicted in FIG. 1 is mounted axially between a compressor (not depicted) located upstream and a combustion chamber 12 of the turbomachine in order to straighten and guide the stream of air leaving the compressor and supplying air to the chamber 12 which itself feeds a turbine (not depicted) positioned downstream of the chamber.

This device 10 comprises, from the upstream direction downstream, a flow straightener 14 and a diffuser 16 which are joined together and supported by an outer frustoconical web 18 which diverges outward in the upstream direction and is fixed by an outer annular flange 20 to an outer casing 22 of the chamber and by an inner frustoconical web 24 which converges inward in the downstream direction and is fixed by an inner annular flange 26 to an inner casing 28 of the chamber 12.

The outer casing 22 of the chamber bears fuel injectors 30 uniformly distributed on a circumference about the longitudinal axis of the chamber and opening into the chamber at their radially inner end. The fuel injected into the chamber is intended to mix with air leaving the device 10 and be burnt then injected into the turbine to drive the rotation of a shaft of the turbomachine.

The diffuser 16 comprises an inner wall of revolution 32 connected to the inner frustoconical web 24 and an outer wall of revolution 34 connected to the outer frustoconical web 18, the walls 32 and 34 being joined together by radial partitions 36, for example 18 of these.

The flow straightener 14 comprises an inner shroud 38 which is axially aligned with the inner wall of revolution 32 of the diffuser, an outer shroud 40 which is axially aligned with the outer wall of revolution 34 of the diffuser, and vanes 42 which extend radially between the inner 38 and outer 40 shrouds of the flow straightener. There are, for example, 126 vanes 42 that are independent of, and axially offset in the upstream direction from, the radial partitions 36 of the diffuser.

Figure 2:
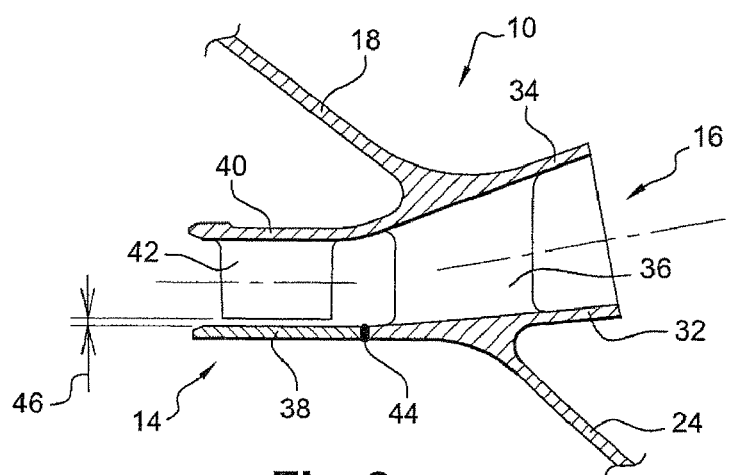
FIG. 2 is a view on a larger scale of part of FIG. 1.

In the example depicted in FIGS. 1 and 2, the outer shroud 40 and the vanes 42 of the flow straightener 14 are formed as one with the outer wall 34 of the diffuser 16. The inner shroud 38 of the flow straightener is fixed at its downstream end, for example by welding 44, to the upstream end of the inner wall 32 of the diffuser, and is separated from the radially inner end of each vane 42 by a small radial clearance 46. The vanes 42 and the outer shroud 40 of the flow straightener are, for example, cast as one with the diffuser 16. The inside diameter of the shroud 38 at its downstream end is equal to the inside diameter of the wall 32 of the diffuser at its upstream end.

The radial clearance 46 between the radially inner ends of the vanes and the inner shroud may vary from 0.1 to 0.5 mm in operation because of thermal expansions and because of the centrifugal forces to which the vanes 42 and the shrouds 38, 40 of the flow straightener are subjected.

Figure 3:
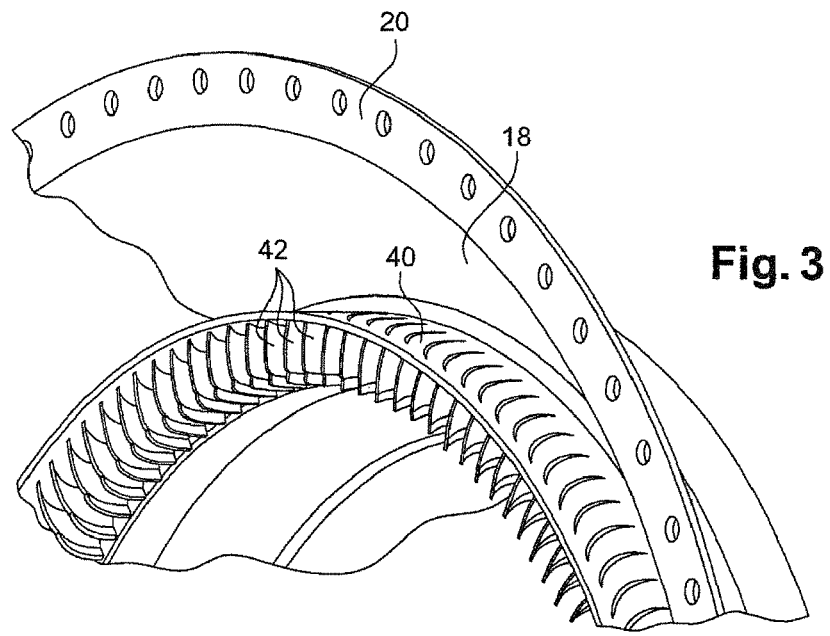
FIG. 3 is a schematic perspective view of a variant embodiment of the device according to the invention, viewed from the upstream direction and without the inner shroud of the flow straightener.
Figure 4:
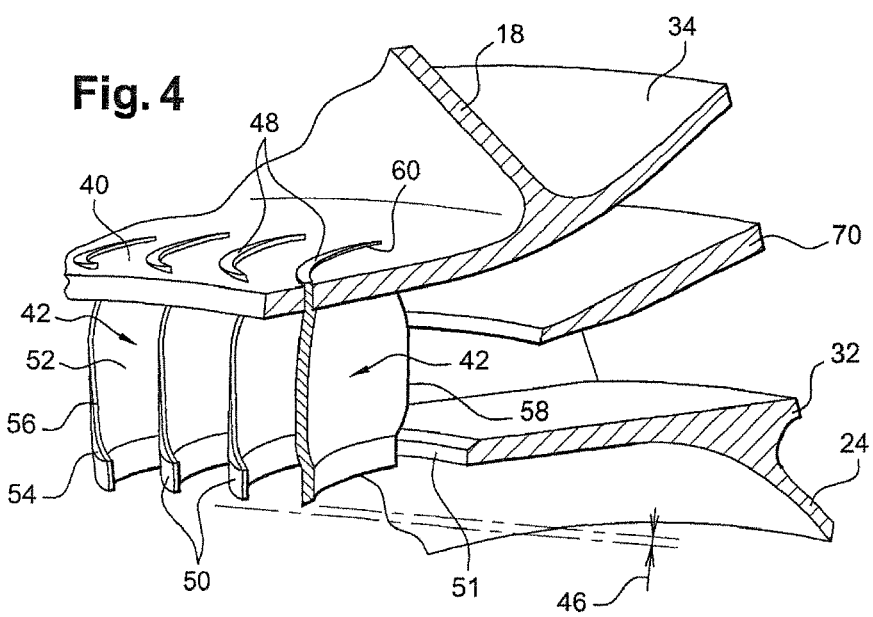
FIG. 4 is another schematic perspective view of the device of FIG. 3.

In the variant embodiment depicted in FIGS. 3 and 4, the vanes 42 are fixed at their radially outer end 48 to the outer shroud 40 of the flow straightener which is still formed as one with the diffuser 16. The radially inner ends 50 of the vanes are separated by a small radial clearance 46 from the inner shroud (not depicted) of the flow straightener which is welded to the upstream end 51 of the inner wall 32 of the diffuser.

The vanes 42 comprise, in the conventional way, an intrados 52 or concave interior surface and an extrados 54 or convex exterior surface which are joined at their upstream end at a leading edge 56 and at their downstream end at a trailing edge 58. The vanes are for example produced by ECM (Electro Chemical Machining).

The radially outer end part of each vane forms means 48 of insertion into a corresponding slot 60 made in the outer shroud 40 of the flow straightener. The slots 60 are substantially radial and through-slots and are uniformly distributed about the axis of the shroud. The means of insertion 48 of the vane are engaged in a slot 60 in a substantially radial direction and are held therein for example by brazing the radially outer end of the vane to the outer cylindrical surface of the shroud 40. The slots 60 may be cast in or formed by laser cutting of the shroud.

In one particular embodiment, the vanes 42 are held in position in the slots 60 of the shroud by means of manually aimed spot flash welding (with spots 1 mm in diameter for example) or electric arc welding between the radially outer ends of the vanes and the outer cylindrical surface of the shroud.

In another variant depicted in FIGS. 5 to 8, the vanes 42 of the flow straightener are secured by their radially inner end to the inner shroud 38 of the flow straightener which is attached and fixed at its downstream end to the upstream end of the inner wall 32 of the diffuser. The outer shroud 40 of the diffuser is formed as one with the diffuser 16 and is separated by a small radial clearance from the radially outer end of each vane.

Figure 7:
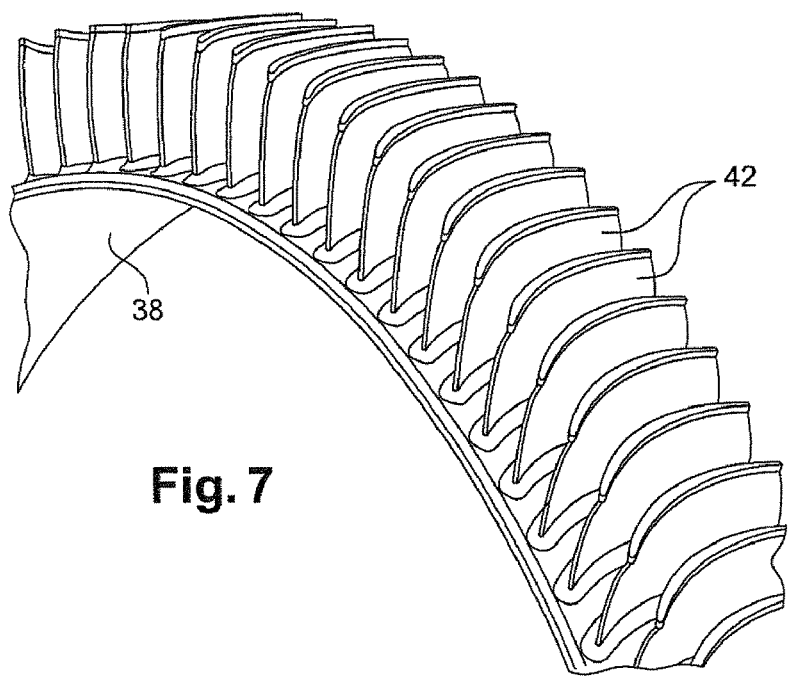
FIG. 7 is a schematic perspective view of part of the flow straightener of FIG. 6.

In FIG. 7, the vanes 42 and the inner shroud 38 of the flow straightener are formed as one by an appropriate technique such as casting, EDM (Electro Discharge Machining), high speed milling, etc.

Figure 8:
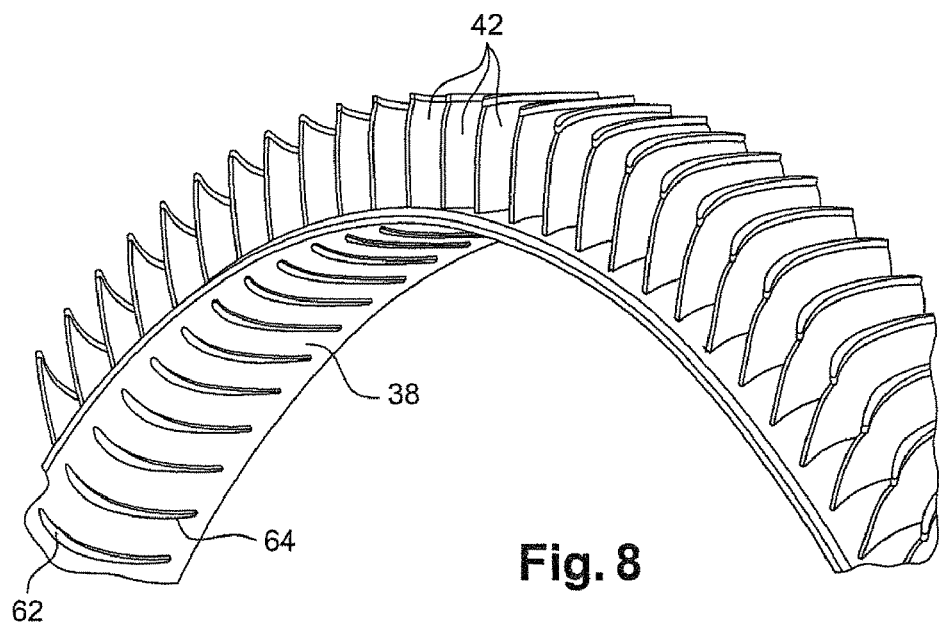
FIG. 8 is a view corresponding to FIG. 7 and illustrating a variant embodiment of the flow straightener.

As an alternative and as depicted in FIG. 8, the radially inner ends 62 of the vanes 42 are inserted and fixed in corresponding radial slots 64 of the inner shroud. These vanes are similar to those described with reference to FIGS. 3 and 4 and the slots 64 in the shroud are through-slots uniformly distributed about the axis of the shroud. The radially inner ends of the vanes may be brazed to the interior cylindrical surface of the shroud 38.

The inner shroud 38 of the flow straightener advantageously comprises a centering axial annular rim 66 (FIG. 5a) intended to be engaged radially inside the inner wall of the diffuser to make it easier to fit the shroud. The shroud 38 in this case is fixed to the wall 32 of the diffuser by welding the downstream end of this rim 66 to the interior cylindrical surface of the wall 32 in order to prevent the spots or bead of weld material from projecting toward the inside and disturbing the flow of air through the device. The inner shroud 38 of each aforementioned device may also be equipped with this axial rim 66.

Figure 5:
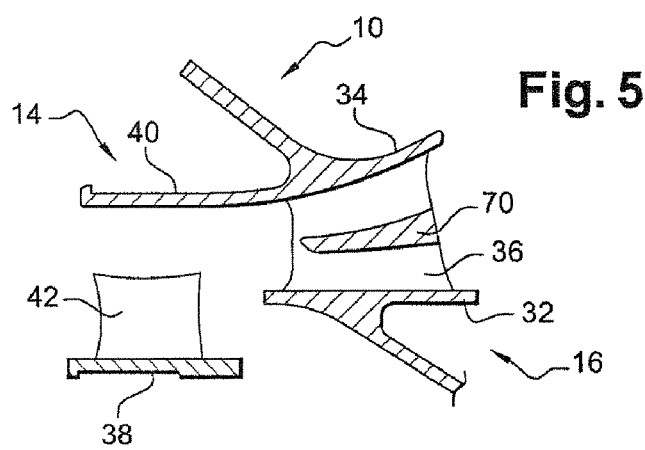
FIG. 5 is a view corresponding to FIG. 2 and illustrating another variant embodiment of the invention.
Figure 5A:
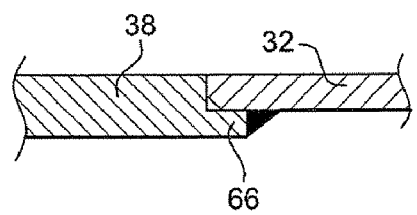
FIG. 5a is an enlarged view of an embodiment detail in a variant of the invention.
Figure 6:
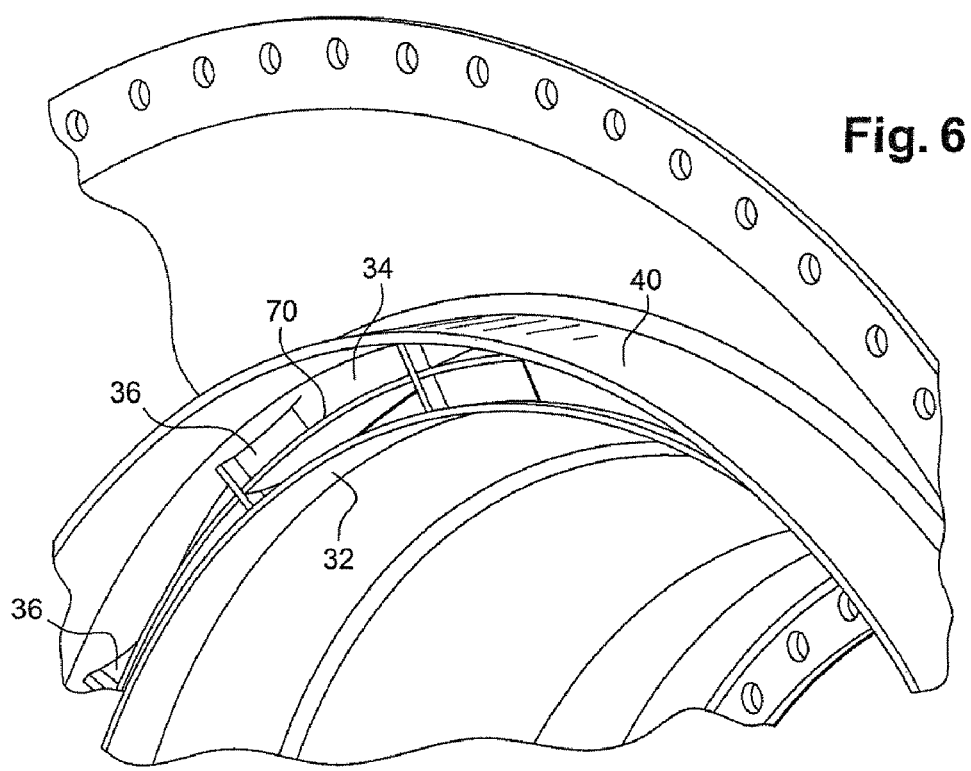
FIG. 6 is a schematic perspective view of the device of FIG. 5, viewed from the upstream direction and without the inner shroud and the vanes of the flow straightener.

In the examples of FIGS. 4, 5 and 6, the diffuser 16 comprises a divider 70 which is borne by the radial partitions 36 of the diffuser between its inner 32 and outer 34 walls, this divider having the purpose of splitting the stream of gas leaving the flow straightener into two coaxial annular flows.

The flow straightener 14 and the diffuser 16 are, for example, made of an alloy based on nickel and chromium.

The invention claimed is:

1. A device for guiding a stream of air entering a combustion chamber of a turbomachine, comprising:
   a flow straightener comprising first and second coaxial shrouds between which substantially radial vanes extend; and
   a diffuser disposed downstream of the flow straightener, the diffuser comprising first and second coaxial walls of revolution joined together by radial partitions,
   wherein the first shroud of the flow straightener is formed as one with the first wall of revolution of the diffuser,
   wherein the second shroud of the flow straightener is added and attached to the second wall of revolution of the diffuser, and
   wherein the substantially radial vanes of the flow straightener are secured at a first end to the first shroud of the flow straightener and separated by a small clearance from the second shroud at a second end.

2. The device as claimed in claim 1, wherein:
   the first and second coaxial shrouds of the flow straightener comprise an inner shroud and an outer shroud, the outer shroud disposed at a radial distance from a common axis of the first and second coaxial shrouds greater than that of the inner shroud,
   the first and second coaxial walls of revolution comprise an inner wall of revolution and an outer wall of revolution, the outer wall of revolution disposed at a radial distance from a common axis of the first and second coaxial walls of revolution greater than that of the inner wall of revolution,
   the outer shroud and the outer wall of revolution are formed as one, and
   the inner shroud is fixed to the inner wall of revolution.

3. The device as claimed in claim 2, wherein the outer shroud is cast as one with the diffuser.

4. The device as claimed in claim 2, wherein a downstream end of the inner shroud is welded to an upstream end of the inner wall of revolution.

5. The device as claimed in claim 2, wherein the substantially radial vanes of the flow straightener are secured via radially outer ends to the outer shroud and are separated by a small radial clearance from the inner shroud.

6. The device as claimed in claim 2, wherein the substantially radial vanes of the flow straightener are secured via their radially inner ends to the inner shroud and are separated by a small radial clearance from the outer shroud.

7. The device as claimed in claim 2, wherein the inner shroud comprises an axial annular rim engaged radially inside the inner wall of revolution.

8. The device as claimed in claim 1, wherein:
   one of the first or second coaxial shrouds of the flow straightener comprises at least one slot, and at least one vane end of the substantially radial vanes is fixed to the at least one slot.

9. The device as claimed in claim 1, wherein the substantially radial vanes are formed as one with one of the first or second coaxial shrouds of the flow straightener.

10. The device as claimed in claim 1, wherein the clearance between the substantially radial vanes and one of the first and second coaxial shrouds of the flow straightener ranges between about 0.1 and 0.5 mm in operation.

11. A turbomachine, which comprises a device as claimed in claim 1.

12. A diffuser for a turbomachine, comprising:
   a first wall of revolution;
   a second wall of revolution joined to the first wall of revolution by at least one radial partition; and
   a first frustoconical web attached to the first wall of revolution,
   wherein a first shroud of a flow straightener is formed as one with the first wall of revolution,
   wherein the second wall of revolution is arranged coaxially with the first wall of revolution,
   wherein the first shroud of the flow straightener extends axially in the upstream direction beyond the second wall of revolution, and
   wherein the first wall of revolution extends axially downstream from an attachment point of the first frustoconical web to the first wall of revolution.

13. The diffuser as claimed in claim 12, wherein the first shroud of the flow straightener comprises a plurality of radial through-slots uniformly distributed about the axis of the diffuser.

14. The diffuser as claimed in claim 13, wherein the number of radial through-slots is more than 100.

15. The diffuser as claimed in claim 12, wherein the first shroud of the flow straightener is formed as one with radial vanes which are uniformly distributed about the axis of the diffuser.

16. The diffuser as claimed in claim 15, wherein the number of radial vanes is more than 100.

17. The diffuser for a turbomachine of claim 12, wherein the first frustoconical web diverges radially outward in the upstream direction.

18. The diffuser for a turbomachine of claim 12, wherein the first frustoconical web converges radially inward in the downstream direction.

19. The diffuser for a turbomachine of claim 12, further comprising a second frustoconical web attached to the second wall of revolution.

20. The diffuser for a turbomachine of claim 12, wherein the first frustoconical web comprises an outer annular flange.

* * * * *